US008296268B2

(12) United States Patent
Ingles et al.

(10) Patent No.: US 8,296,268 B2
(45) Date of Patent: Oct. 23, 2012

(54) SYSTEM AND METHOD FOR CHANGE LOGGING IN A FIRMWARE OVER THE AIR DEVELOPMENT ENVIRONMENT

(75) Inventors: Roger H. Ingles, North Richland Hills, TX (US); Sudheer Kumar Peddireddy, Garland, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1859 days.

(21) Appl. No.: 11/490,927

(22) Filed: Jul. 21, 2006

(65) Prior Publication Data

US 2008/0030757 A1 Feb. 7, 2008

(51) Int. Cl.
*G06F 7/00* (2006.01)

(52) U.S. Cl. ........................................... 707/672
(58) Field of Classification Search .................. 707/672
See application file for complete search history.

(56) References Cited

U.S. PATENT DOCUMENTS

| 5,729,735 | A | * | 3/1998 | Meyering ............................... 1/1 |
| 5,842,024 | A | * | 11/1998 | Choye et al. .................. 717/178 |
| 5,893,119 | A | * | 4/1999 | Squibb ................................... 1/1 |
| 6,006,239 | A | * | 12/1999 | Bhansali et al. ....................... 1/1 |
| 6,018,747 | A | * | 1/2000 | Burns et al. ............................ 1/1 |
| 6,192,365 | B1 | * | 2/2001 | Draper et al. .................. 707/648 |
| 6,230,316 | B1 | * | 5/2001 | Nachenberg .................. 717/169 |
| 6,542,906 | B2 | * | 4/2003 | Korn ................................ 707/641 |
| 6,671,703 | B2 | * | 12/2003 | Thompson et al. .................... 1/1 |
| 6,671,757 | B1 | * | 12/2003 | Multer et al. ................. 710/100 |
| 6,707,986 | B2 | * | 3/2004 | Nishi et al. .................... 386/248 |
| 6,816,873 | B2 | * | 11/2004 | Cotner et al. .......................... 1/1 |
| 6,925,467 | B2 | * | 8/2005 | Gu et al. ........................ 707/687 |
| 6,925,476 | B1 | * | 8/2005 | Multer et al. ......................... 1/1 |
| 7,415,486 | B2 | * | 8/2008 | Multer ................................ 1/1 |
| 7,461,373 | B2 | * | 12/2008 | Herle et al. .................... 717/171 |
| 7,613,815 | B1 | * | 11/2009 | Prakash et al. ................ 709/230 |
| 7,779,401 | B2 | * | 8/2010 | Scian et al. .................... 717/168 |
| 7,797,693 | B1 | * | 9/2010 | Gustafson et al. ............ 717/168 |
| 7,831,965 | B1 | * | 11/2010 | Pittore et al. .................. 717/165 |
| 7,890,469 | B1 | * | 2/2011 | Maionchi et al. ............. 707/654 |
| 2001/0044805 | A1 | * | 11/2001 | Multer et al. .................. 707/201 |
| 2002/0165724 | A1 | * | 11/2002 | Blankesteijn ...................... 705/1 |
| 2004/0034849 | A1 | * | 2/2004 | Cohen et al. .................. 717/120 |
| 2004/0064544 | A1 | * | 4/2004 | Barsness et al. .............. 709/224 |
| 2004/0068501 | A1 | * | 4/2004 | McGoveran ........................ 707/8 |
| 2004/0133887 | A1 | * | 7/2004 | Herle et al. .................... 717/171 |
| 2004/0218902 | A1 | * | 11/2004 | Yanagita .......................... 386/52 |

(Continued)

OTHER PUBLICATIONS

Burns et al., "In-Place Reconstruction of Version Differences," 2003, IEEE Computer Society, IEEE Transactions on Knowledge and Data Engineering, vol. 15, No. 4 Jul./Aug. 2003, pp. 973-984.*

(Continued)

*Primary Examiner* — Fred I Ehichioya
*Assistant Examiner* — Richard Bowen

(57) ABSTRACT

The present disclosure relates generally to a system and method for change logging in a firmware over the air (FOTA) development environment. In one example, the method may include creating a cumulative change log for an intermediate binary file that contains an extractable binary image. The cumulative change log may record changes between the intermediate binary file and earlier iterations of the intermediate binary file. The cumulative change log may be stored in the intermediate binary file and later retrieved. The cumulative change log may be analyzed to identify statistics about changes that occurred between the intermediate binary file and earlier iterations of the intermediate binary file.

20 Claims, 5 Drawing Sheets

U.S. PATENT DOCUMENTS

2007/0132774 A1*  6/2007  Fan et al. .................... 345/564
2007/0274598 A1* 11/2007  Dahms et al. ................ 382/232

OTHER PUBLICATIONS

Burns et al., "In-Place Reconstruction of Delta Compressed Files," 1998, ACM, Annual ACM Symposium on Principles of Distributed Computing Proceedings of the seventeenth annual ACM symposium on Principles of distributed computing, pp. 267-275.*

Xing et al., "Understanding Class Evolution in Object-Oriented Software," 2004, IEEE, Proceedings of the 12th IEEE International Workshop on Program Comprehension (IWPC'04), pp. 34.*

* cited by examiner

SYSTEM AND METHOD FOR CHANGE LOGGING IN A FIRMWARE OVER THE AIR DEVELOPMENT ENVIRONMENT

BACKGROUND

Handsets and other wireless devices contain software in the form of executable instructions and non-executable data stored in a memory. The software provides such devices with the ability to perform various functions, such as communicate via a wireless network, handle call features such as call waiting and call forwarding, and maintain a calendar and address book.

However, once a wireless device is provided to an end user, it becomes difficult to provide additional software or to make corrections to the software already installed on the device. To address this problem, firmware over the air (FOTA) was developed to enable a service provider to send software updates over a wireless network to a wireless device. Such updates may provide additional functionality to software already existing on the wireless device or may provide bug fixes to address problems with the existing software. However, while an update process such as FOTA presents a way to send software to a wireless device, the development process to create and maintain such software is not without problems. Accordingly, the development of software in a FOTA environment is challenging and in need of improvement.

SUMMARY

In one embodiment, a method for maintaining a change log when creating iterations of a binary image for use in a mobile device is provided. The method comprises creating a first intermediate binary file containing header information and image information for a first binary image, and creating a second intermediate binary file containing header information and image information for a second binary image. A first change log is inserted into the second intermediate binary file, wherein the first change log contains differences between the first and second intermediate binary files. A third intermediate binary file containing header information and image information for a third binary image is created. The first change log and a second change log are inserted into the third intermediate binary file, wherein the second change log contains differences between the second and third intermediate binary files.

In another embodiment, a method for use in a firmware over the air development environment is provided. The method comprises creating a cumulative change log for an intermediate binary file that contains an extractable binary image, wherein the cumulative change log records changes between the intermediate binary file and earlier iterations of the intermediate binary file. The cumulative change log is stored in the intermediate binary file and retrieved from the intermediate binary file. The cumulative change log is analyzed to identify statistics about changes that occurred between the intermediate binary file and earlier iterations of the intermediate binary file.

In yet another embodiment, a system for change logging in a firmware over the air environment is provided. The system comprises a processor, a memory coupled to the processor, and a plurality of computer executable instructions stored in the memory for execution by the processor. The instructions include instructions for creating a base intermediate binary file containing header information and image information for a binary image, and creating at least first and second iterations of the intermediate binary file. The instructions also include instructions for creating a first change log representing differences between the base and first intermediate binary files and a second change log representing differences between the first and second intermediate binary files. The instructions also include instructions for inserting the first change log into the first iteration of the intermediate binary file and the first and second change logs into the second iteration of the intermediate binary file. The instructions also include instructions for extracting an executable binary image from the second intermediate binary file.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 7:
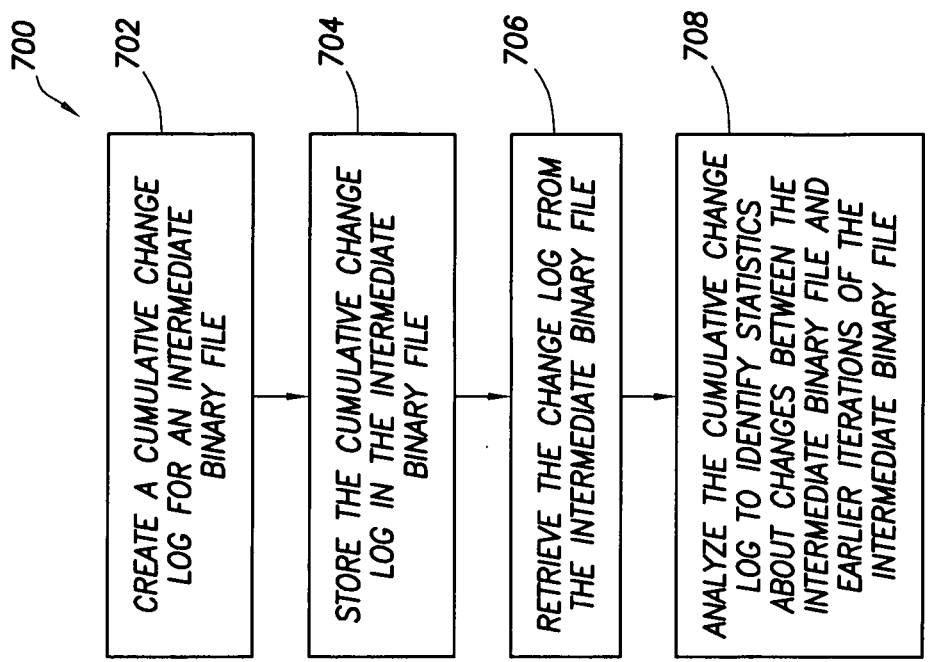
FIG. 7 is a flowchart of one embodiment of a method for storing, retrieving, and analyzing a change log in an intermediate binary file.

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
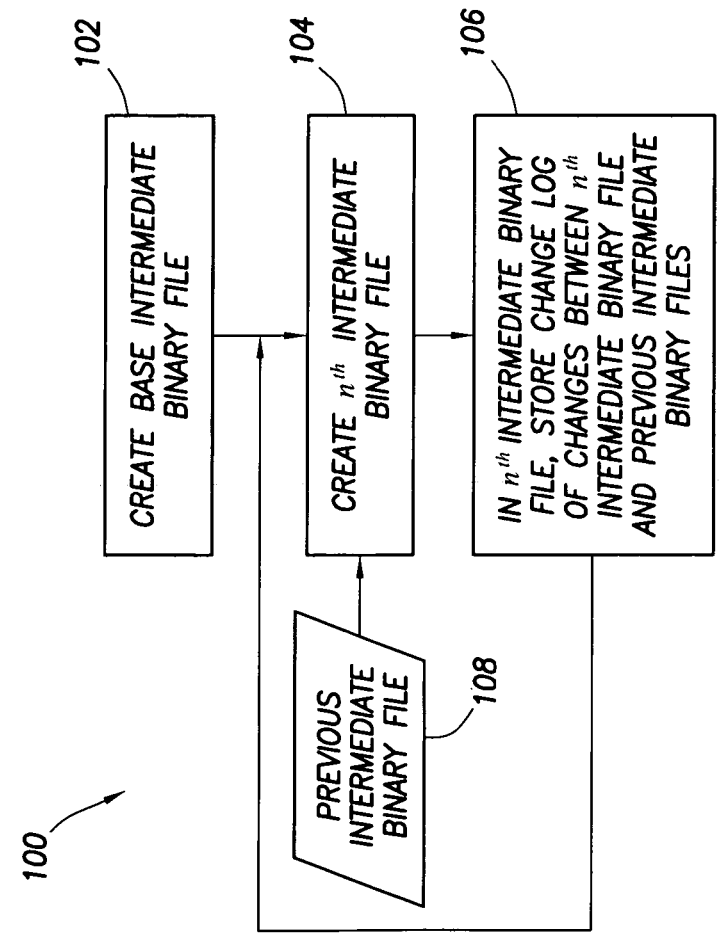
FIG. 1 is a flowchart of one embodiment of a method that may be used to track changes between iterations of a binary image.

Referring to FIG. 1, in one embodiment, a method 100 may be used to track changes between iterations of a binary image, such as a binary image to be used in a FOTA system. For example, the method may be used during the development process of a binary image prior to its loading via a FOTA mechanism. In another example, the initial version of the binary image may be loaded onto a cellular phone or a similar device and the development process may be used to develop later versions that may then be used to update the initial version. In the present example, the software environment in which the binary images are created may use one or more change logs to track changes between the different binary images.

In step 102, a base intermediate binary file may be created. As will be described later in greater detail, the intermediate binary file may contain header information and image information for a first version of the binary image. In operation, the binary image information may be extracted from the intermediate binary file to create the binary image.

In step 104, a second intermediate binary file may be created containing header information and image information for a second version of the binary image. The previous intermediate binary file 108 (which is the base intermediate binary file in this iteration) may be used in the creation of the second intermediate binary file. In step 106, a change log containing differences between the base intermediate binary file and the second intermediate binary file may be stored in the second intermediate binary file.

Steps 104 and 106 may be repeated each time another version of the intermediate binary file is created. Accordingly, in each iteration, a new $n^{th}$ intermediate binary file may be created and a change log may be stored in the $n^{th}$ intermediate binary file that tracks changes between the $n^{th}$ intermediate binary file and previous intermediate binary files.

It is understood that the change log in an intermediate binary file may be a compilation of the previous change logs or each change log may be maintained separately. For example, the $n^{th}$ intermediate binary file may contain a sequential list of change logs. For such a list, each change log may be associated with a particular intermediate binary file using, for example, a version number, date stamp, and/or other identification mechanisms.

Figure 2:
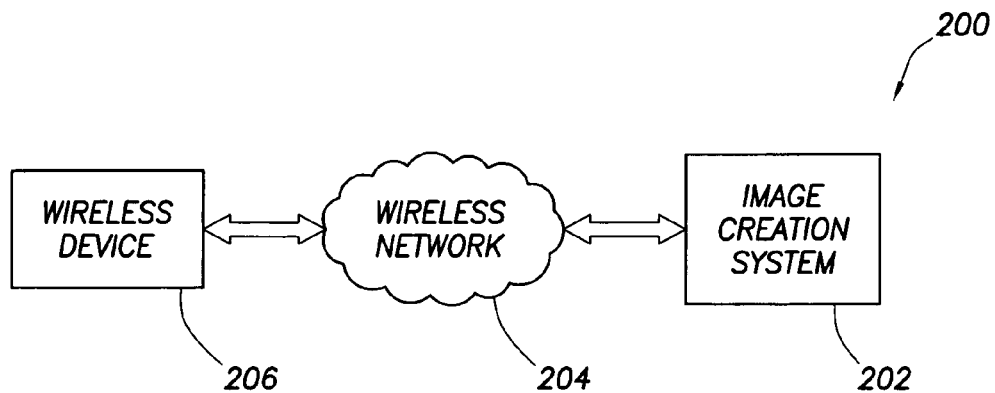
FIG. 2 is a diagram of one embodiment of a system within which the present invention may be practiced.

Referring to FIG. 2, one embodiment of a system 200 within which the present invention may be practiced is illustrated. The system 200 includes an image creation system 202, a wireless network 204, and a wireless device 206. As will be described below in greater detail, the image creation system 202 provides functionality to create an image containing executable instructions and/or data. The image is transferred via the wireless network 204 to the wireless device 206. The wireless device 206 then uses the image to provide functionality to a user and communicate with other devices via the wireless network 204. The image may contain various combinations of functionality and data, and additional features and bug fixes may be used to update the image by the image creation system 202. The network 204 may be any type of network, including centralized and ad hoc networks, and may use any type of network technology, including Code Division Multiple Access (CDMA), Global System for Mobile communication (GSM), Orthogonal Frequency Division Multiplexing (OFDM), Universal Mobile Telecommunications System (UMTS), Enhanced Data GSM Environment (EDGE, which may also represent Enhanced Data rates for Global Evolution, and Enhanced Data Rates for GSM Evolution), or other communications technologies. In the present example, the network is a packet-based network, but it is understood that the present disclosure applies to any type of transmission.

Figure 3:
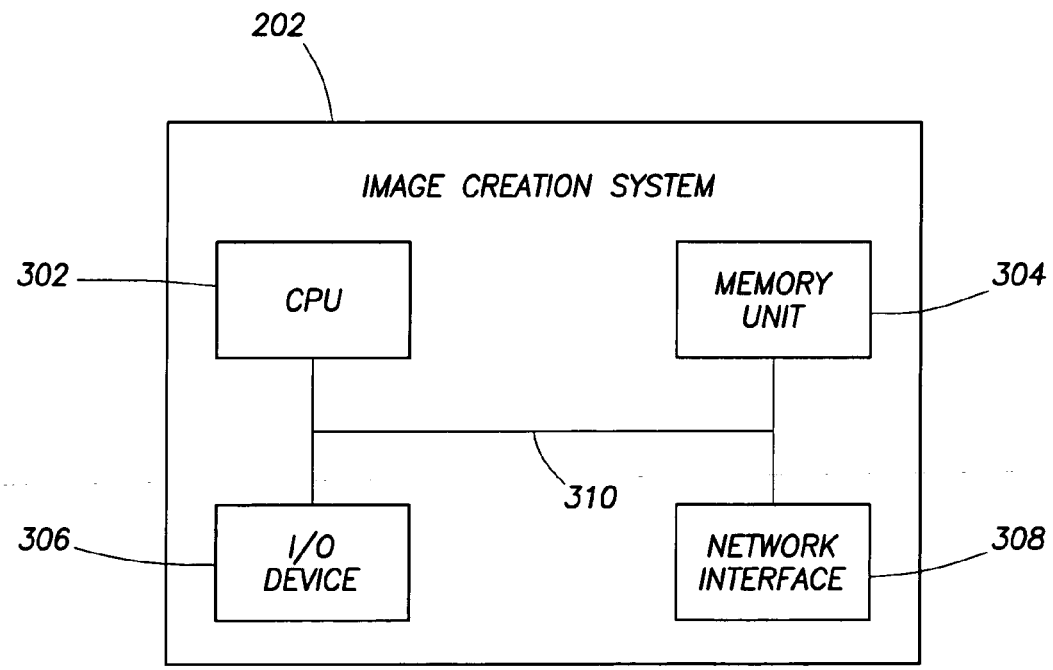
FIG. 3 is a block diagram of one embodiment of an image creation system that may be used with the system of FIG. 2.

Referring to FIG. 3, a computer is illustrated as one embodiment of the image creation system 202 of FIG. 2. The computer 202 may include a central processing unit ("CPU") 302, a memory unit 304, an input/output ("I/O") device 306, and a network interface 308. The network interface 308 may be, for example, one or more wireless and/or wireline network interface cards (NICs) that are each associated with a media access control (MAC) address. The network interface 308 may be coupled directly to the network 104 or may be coupled via one or more other networks (not shown). The components 302, 304, 306, and 308 are interconnected by a bus system 310.

It is understood that the computer 202 may be differently configured and that each of the listed components may actually represent several different components. For example, the CPU 302 may represent a multi-processor or a distributed processing system; the memory unit 304 may include different levels of cache memory, main memory, hard disks, and remote storage locations; and the I/O device 306 may include monitors, keyboards, and the like. Furthermore, although shown within the computer 202, it is understood that some components (e.g., a keyboard) may be physically located outside of the computer. In addition, some or all of the components 302, 304, 306, and 308 may be distributed. Therefore, a wide range of flexibility is anticipated in the configuration of the computer 202.

Figure 4:
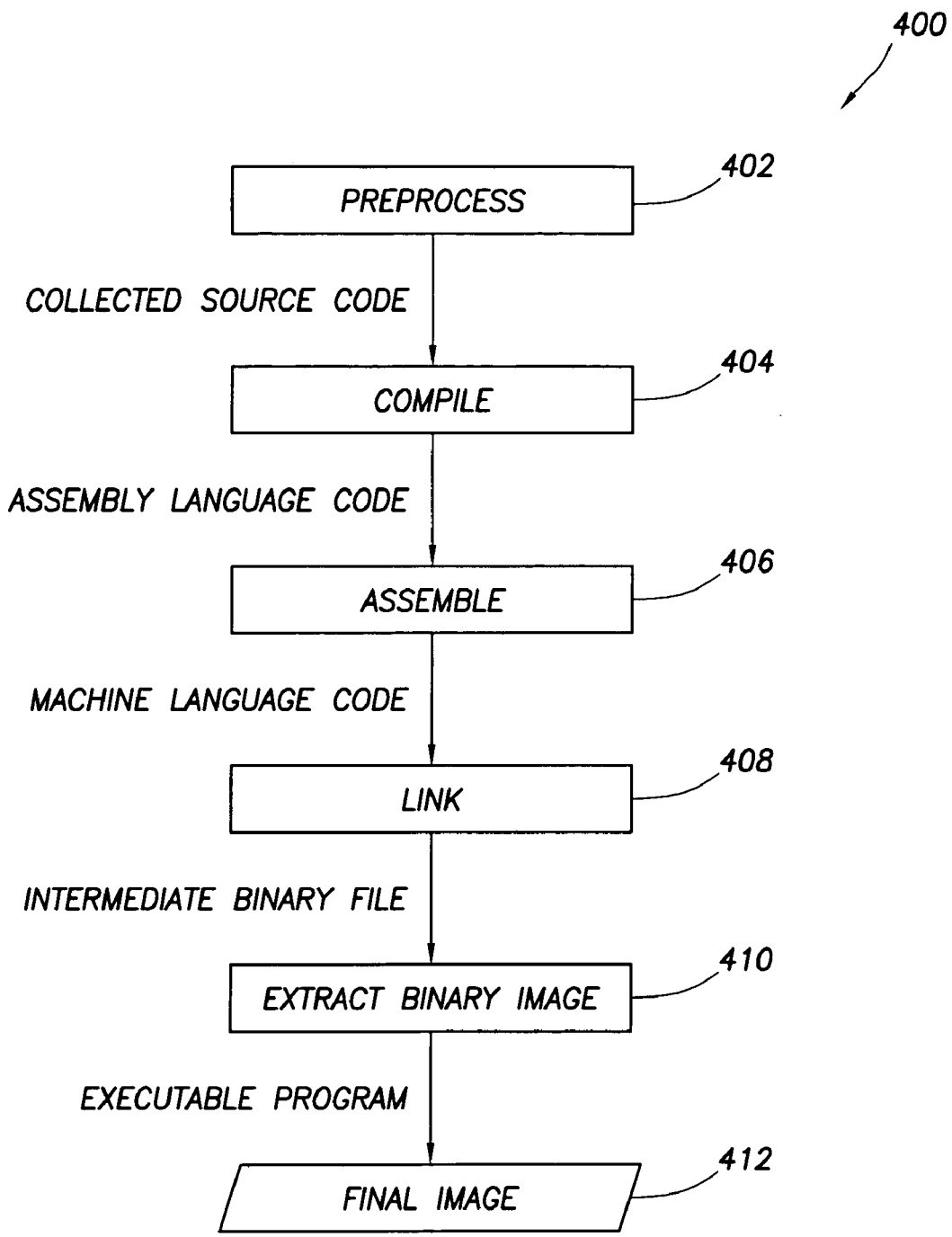
FIG. 4 is a flowchart of one embodiment of a method by which a binary image may be created within the system of FIG. 2.

Referring to FIG. 4, one embodiment of a compiling method 400 illustrates the use of various modules for compiling a binary image 412 in the image creation system 202 of FIG. 2. A software program is generally written using a high level language (i.e., source code) and converted into machine readable language (i.e., object code). Although some variations in terminology and actual processing may occur, the compiling method 400 describes the basic functionality provided by modules used in a common conversion process including a preprocessing step 402, a compiling step 404, an assembling step 406, and a linking step 408. The preprocessing step 402, compiling step 404, assembling step 406, and linking step 408 may be commonly used processes that are generally associated with a specific programming language and/or platform.

The preprocessor step 402 is responsible for collecting different parts of a source program that is to be compiled. The compiling step 404 takes the output of the preprocessing step 402 and converts it into assembly language code, and the assembling step 406 translates the assembly language code into machine language code. The linking step 408 takes the machine language code, identifies any libraries or other external modules referred to by the machine language code, and binds these modules to the machine language code to form an intermediate binary file. The intermediate binary file may contain the binary image 412, as well as other information such as a header and debug information. The binary image 412 is extracted from the intermediate binary file in step 410 and may be loaded onto a mobile device using FOTA or another loading mechanism.

In some compilation systems, a step may optionally be executed during the compilation method 400 to record changes (e.g., in a log file). For example, such a step may be inserted into the method 400 prior to the linking step 408 (e.g., between the assembling step 406 and the linking step 408) to record changes and may operate by preprocessing the machine language code prior to linking. However, as such a step may be optional, the record of any changes may be lost if the step is not performed. Furthermore, even if the optional step is performed and a record of the changes is generated, there may be no mechanism to ensure that the record is saved or made available for later use. This makes it difficult to collect information regarding, for example, typical changes that may occur in a project's life cycle. This, in turn, makes it difficult to predict future software layout behavior and amount of change that may occur in future software images. Furthermore, even if changes in the software source code can be tracked, such tracking may not provide the ability to detect and store information about actual changes to the binary information itself, which may be desirable for applications such as FOTA.

Figure 5:
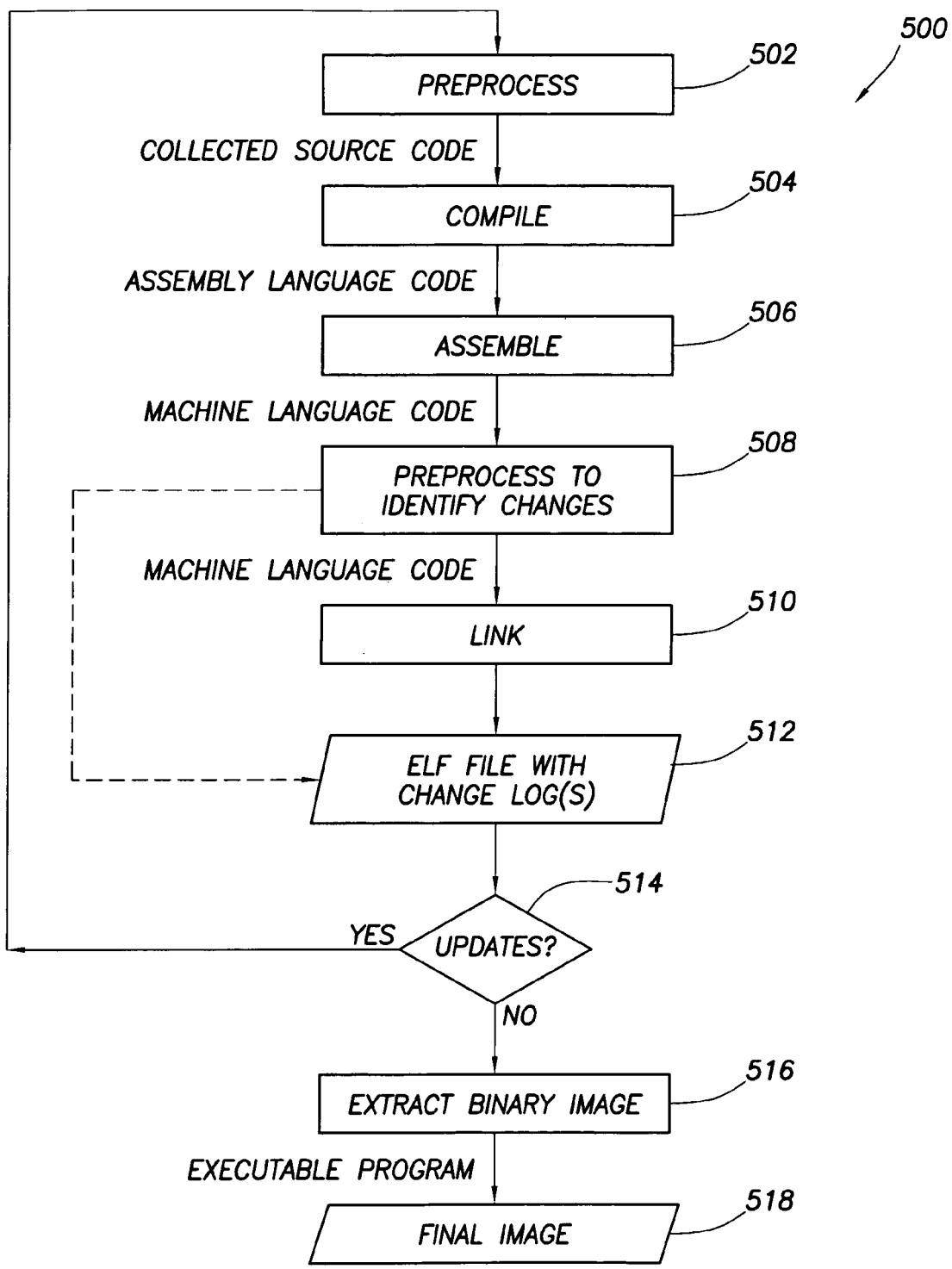
FIG. 5 is a flowchart of one embodiment of a method by which iterations of a binary image may be tracked and stored in an intermediate binary file.

Referring to FIG. 5, in another embodiment, a method 500 may be used to track and save binary change information during the creation of a binary image. In the present example, for purposes of illustration, the method 500 is described with reference to components of the ARM development suite (ADS) produced by ARM, Ltd., of the United Kingdom, and uses the executable and linking format (ELF) as an intermediate binary file format. However, it is understood that other development suites and/or various components of development suites may be used. Accordingly, various references to the ARM linker "armlink" may be replaced with other linkers, and similar replacements may be made as is known to those of skill in the art. In addition, while the present example refers to ELF files, it is understood that other file formats may be used. As is known, files such as ELF files may be a binary file containing not only a software image (e.g., a binary image), but may also contain other sections that are not part of the software image such as debug and symbol information that may be used to debug the software image.

The method 500 may begin with various steps, such as a preprocessing step 502, compiling step 504, and assembling step 506. As similar preprocessing, compiling, and assembling steps were described with respect to FIG. 4, they will not be described in detail in the present example.

In step 508, assuming that an earlier iteration of an ELF file is present, preprocessing (different than the preprocessing of step 502) may occur on the machine language code produced by the assembling step 506. For example, the preprocessing step 508 may mimic the linking step 510 to identify changes that have occurred between the earlier ELF file and the ELF file to be linked in the current iteration. If no earlier ELF file is available, step 508 may be skipped.

In step 510, the machine language code may be linked to create an ELF file 512 (e.g., an ELF image). If the preprocessing step 508 identified changes, these changes may be inserted into the ELF file as a change log. For example, the software tool controlling the method 500 may insert the change log after the linking step 510 is complete. It is understood that different methods may be used to identify changes between various iterations of an ELF file and store those changes in the current iteration of the ELF file, and such methods may occur at different places in the method 500. Accordingly, the use of a preprocessing step and a later insertion of the change log into the ELF file is for purposes of example only.

During a development process represented by the method 500, a determination may be made in step 514 as to whether there are any updates for the ELF image. For example, if modifications (e.g., bug fixes or the addition of features) are to be made, the method 500 may return to step 502 (or another step) for an additional iteration. Any changes that occur between iterations may then be stored in the change log of the current iteration of the ELF file.

If no changes are to be made (e.g., the binary image is ready for release), the method may continue to step 516 where the binary image 518 is extracted from the ELF file. It is understood that, in some embodiments, step 516 may be repeated to create updated binary images 518 as additional versions of the software are released. Accordingly, the use of change logs stored within the iterations of the ELF file 512 may be used not only within the development cycle for the release of a single binary image 518, but may also be used for iterations resulting in the release of updated binary images 518.

It is understood that the information stored as part of a change log in an intermediate binary file such as an ELF file may vary. For example, the information may include the size and location of a file or a portion of a file in the current iteration compared to previous iterations. Additional information may include a global symbol that is coupled to the changed file. For example, a data symbol may be associated to a global symbol that is relatively unique, while executable code may be associated with a less unique global symbol (e.g., the first subroutine of a long list of subroutines).

Accordingly, the change log(s) in an intermediate binary file, such as an ELF image, may store information in a format that is relatively easy to access and that may be customized. For example, all software that creates an intermediate binary file for a project may be required to record changes. Furthermore, specific parameters may be required to create the desired level of detail for such reports. In this manner, analysis of various statistics obtained from the change logs may be performed during or after a project to determine factors of interest, such as which sections of code are changing the most and what software development group in the development process is responsible for the majority of the changes.

Figure 6:
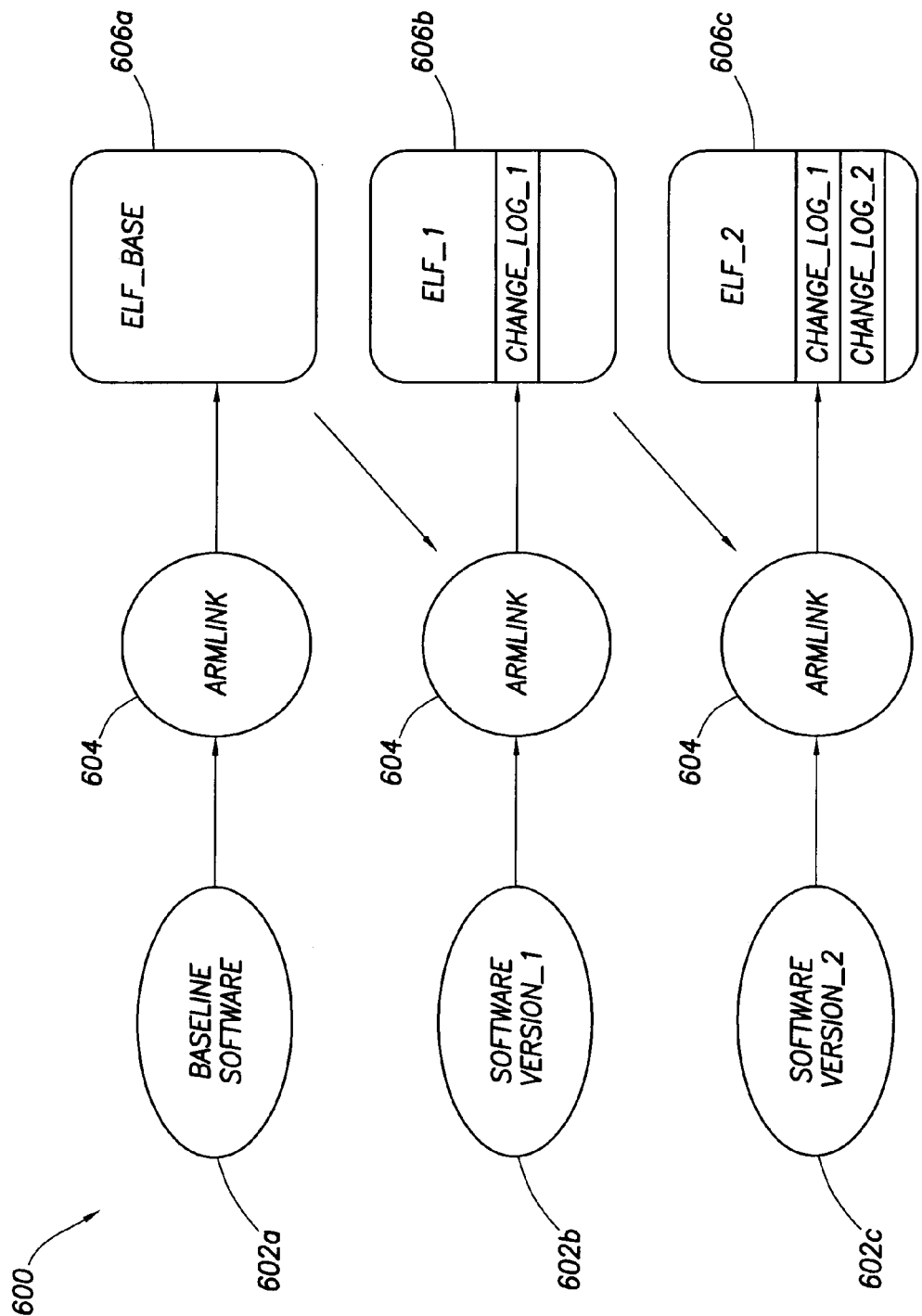
FIG. 6 is a diagram of one embodiment of a process illustrating the use of a cumulative change log with iterations of an ELF file.

With additional reference to FIG. 6, a diagram 600 illustrates a summary of one embodiment of a portion of the method 500 of FIG. 5. Baseline software 602 is processed by armlink linker 604. Although not shown, a software development suite may be used to control the process illustrated by FIG. 6 and additional steps of FIG. 5 may be performed. Processing by armlink 604 results in an ELF_base image 606*a*.

Changes may be made to the baseline software 602*a*, resulting in software version_1 602*b*. Software version_1 602*b* is processed by armlink 604, resulting in a modified ELF_1 image 606*b* (modified relative to the ELF_base image 606*a*). As indicated, the ELF_base image 606*a* may be used (e.g., by the software development suite) to aid in managing the changes between the ELF_base image and ELF_1 image. A change_log_1 may be added to ELF_1 image 606*b* to represent changes between the ELF_base image and ELF_1 image.

Changes may be made to the software version_1 602*b*, resulting in software version_2 602*c*. Software version_2 602*c* is processed by armlink 604, resulting in a modified ELF_2 image 606*c* (modified relative to ELF_1 image 606*b*). As indicated, the ELF_1 image 606*b* may be used (e.g., by the software development suite) to aid in managing the changes between the ELF_1 image 606*b* and ELF_2 image 606*c*. A change_log_2 may be added to ELF_2 image 606*c* to represent changes between the ELF_1 image and ELF_2 image. It is understood that, although the change logs are illustrated as separate logs in FIG. 6, a single cumulative change log may be created for insertion into the ELF_2 image 606*c*.

Referring to FIG. 7, in another embodiment, a method 700 may be used to leverage change log information. In steps 702 and 704, a cumulative change log may be created for an intermediate binary file and stored in the intermediate binary file. As this process has been discussed in previous embodiments, it will not be discussed in detail in the present example.

In step 706, the change log may be retrieved from the intermediate binary file. Such retrieval may occur during the development process (e.g., between iterations of the intermediate binary file) or after the development process is complete (e.g., when the binary image has been extracted). In step 708, the cumulative change log may be analyzed to identify statistics about changes between the various iterations of the intermediate binary file.

For example, such analysis may be desirable to create improved versions of software. As an illustration, if the use of software structures such as dynamic link libraries (DLLs) is desired, it may be beneficial to determine what types of code would be appropriate for DLLs. In addition, in a segmented memory environment such as that often used for FOTA, an analysis of changing code sections may aid in partitioning the binary image efficiently to decrease memory loss, both initially and through later updates. For example, the method 700 may be configured to scan through the cumulative change information stored in the change logs in order to make better decisions in the future when it prepares new software images. This may include the identification and collection of software modules that are relatively stable. For example, the use of cumulative change logs as described in the present disclosure may be used in conjunction with U.S. patent application Ser. No. 11/333,847, filed on Jan. 13, 2006, and entitled "SYSTEM AND METHOD FOR A PATCH MINIMIZATION TOOL", and/or U.S. patent application Ser. No. 11/334,600, filed on Jan. 13, 2006, and entitled "SYSTEM AND METHOD FOR A PSEUDO DLL LINKER", both of which are incorporated by reference herein.

It is understood that the use of cumulative change logs as described herein is not limited to the FOTA environment, but may be implemented in other environments. For example, an automotive dealer may store information such as maintenance, repair, and warranty information within a non-volatile memory inside an automobile. Accordingly, many different applications of the present disclosure may be envisioned.

Although only a few exemplary embodiments of this disclosure have been described in details above, those skilled in the art will readily appreciate that many modifications are possible in the exemplary embodiments without materially departing from the novel teachings and advantages of this disclosure. For example, while the present disclosure frequently uses a mobile device for purposes of example, it is understood that embodiments of the present disclosure can be used with non-mobile devices, such as those with which the size of an update is important. Also, features illustrated and discussed above with respect to some embodiments can be combined with features illustrated and discussed above with respect to other embodiments. Accordingly, all such modifications are intended to be included within the scope of this disclosure.

What is claimed is:

1. A method for maintaining a change log when creating iterations of a binary image for use in a mobile device, the method comprising:
    creating a first intermediate binary file containing header information and image information for a first binary image;
    creating a second intermediate binary file containing header information and image information for a second binary image;
    inserting a first change log into the second intermediate binary file, wherein the first change log contains differences between the first and second intermediate binary files;
    creating a third intermediate binary file containing header information and image information for a third binary image;
    inserting the first change log and a second change log into the third intermediate binary file, wherein the second change log contains differences between the second and third intermediate binary files;
    reviewing the first and second change logs to identify statistics based on the differences between the first, second, and third intermediate binary files;
    partitioning the third binary image to decrease memory loss, the partitioning based on the identified statistics; and
    determining software code for use in a dynamic link library (DLL) based on the identified statistics.

2. The method of claim 1 further comprising combining the first and second change logs in the third intermediate binary file.

3. The method of claim 1 wherein the first and second change logs are maintained separately within the third intermediate binary file.

4. The method of claim 1 further comprising creating the third intermediate binary file based in part on information from the first change log.

5. The method of claim 1 further comprising analyzing the statistics to identify a portion of the first, second, and third intermediate binary files in which a number of changes that occur between the first and second intermediate binary files and between the second and third intermediate binary files are below a threshold value.

6. The method of claim 1 further comprising analyzing the statistics to identify a portion of the first, second, and third intermediate binary files that has changed less between the first and second intermediate binary files and between the second and third intermediate binary files than other portions of the first, second, and third intermediate binary files.

7. The method of claim 1 further comprising:
    creating a fourth intermediate binary file containing header information and image information for a fourth binary image; and
    inserting the first change log, the second change log, and a third change log into the fourth intermediate binary file, wherein the third change log contains differences between the third and fourth intermediate binary files.

8. The method of claim 1 wherein the first and second change logs are automatically created.

9. The method of claim 8 wherein the first and second change logs are maintained separately within the third intermediate binary file.

10. The method of claim 8 further comprising creating the third intermediate binary file based in part on information from the first change log.

11. A method for use in a firmware over the air development environment comprising:
    creating a cumulative change log for an intermediate binary file that contains an extractable binary image, wherein the cumulative change log records changes between the intermediate binary file and earlier iterations of the intermediate binary file;
    storing the cumulative change log in the intermediate binary file;
    retrieving the cumulative change log from the intermediate binary file;
    analyzing the cumulative change log to identify statistics about changes that occurred between the intermediate binary file and earlier iterations of the intermediate binary file;
    partitioning the extractable binary image to decrease memory loss, the partitioning based on the identified statistics; and
    determining software code for use in a dynamic link library (DLL) based at least in part on the identified statistics.

12. The method of claim 11 further comprising analyzing the statistics to identify a portion of the intermediate binary file and earlier iterations of the intermediate binary file in which a number of changes that occurred between the intermediate binary file and earlier iterations of the intermediate binary file are below a threshold value.

13. The method of claim 11 further comprising analyzing the statistics to identify a portion of the intermediate binary file and earlier iterations of the intermediate binary file that has changed less than other portions of the intermediate binary file and earlier iterations of the intermediate binary file.

14. The method of claim 13 further comprising identifying a location and a size of the identified portion within the intermediate binary file.

15. The method of claim 14 further comprising moving the identified portion to another location within the intermediate binary file.

16. A system for change logging in a firmware over the air environment comprising:
- a processor;
- a memory coupled to the processor; and
- a plurality of computer executable instructions stored in the memory for execution by the processor including instructions for:
- creating a base intermediate binary file containing header information and image information for a binary image;
- creating at least first and second iterations of the intermediate binary file;
- creating a first change log representing differences between the base intermediate binary file and the first iteration of the intermediate binary file and a second change log representing differences between the first and second iterations of the intermediate binary file;
- inserting the first change log into the first iteration of the intermediate binary file and the first and second change logs into the second iteration of the intermediate binary file;
- extracting an executable binary image from the second iteration of the intermediate binary file;
- reviewing the first and second change logs to identify statistics based on the differences between the intermediate binary files;
- partitioning the executable binary image to decrease memory loss, the partitioning based on the identified statistics; and
- determining software code for use in a dynamic link library (DLL) based at least in part on the identified statistics.

17. The system of claim 16 further comprising instructions for inserting the first change log into the second iteration of the intermediate binary file separately from the second change log.

18. The system of claim 17 further comprising instructions for combining the first and second change logs into a single cumulative change log in the second iteration of the intermediate binary file.

19. The system of claim 16 further comprising analyzing the first change log prior to creation of the second iteration of the intermediate binary image, wherein the analyzing is used to modify a placement of information within the second iteration of the intermediate binary file.

20. The system of claim 16 wherein the first and second change logs are automatically created with the first and second iterations of the intermediate binary file.

* * * * *